United States Patent
Benvenuto (10) Patent No.: US 7,699,072 B2
(45) Date of Patent: Apr. 20, 2010

(54) DEVICE FOR REGULATING THE DELIVERY PRESSURE OF COMBUSTIBLE GASES

(75) Inventor: Michele Benvenuto, Mogliano Veneto (IT)

(73) Assignee: SIT La Precisa S.p.A. (IT)

(*) Notice: Subject to any disclaimer, the term of this patent is extended or adjusted under 35 U.S.C. 154(b) by 781 days.

(21) Appl. No.: 11/631,385

(22) PCT Filed: Jun. 20, 2005

(86) PCT No.: PCT/IT2005/000356
§ 371 (c)(1),
(2), (4) Date: Dec. 29, 2006

(87) PCT Pub. No.: WO2006/003685
PCT Pub. Date: Jan. 12, 2006

(65) Prior Publication Data
US 2009/0007973 A1    Jan. 8, 2009

(30) Foreign Application Priority Data

| Jul. 2, 2004 | (IT) | .................... PCT/IT2004/0369 |
| Jul. 30, 2004 | (IT) | .......................... PD2004A0203 |
| Nov. 3, 2004 | (IT) | .......................... PD2004A0272 |

(51) Int. Cl.
*F16K 31/126* (2006.01)

(52) U.S. Cl. ........................ 137/510; 137/270; 137/494; 137/495; 137/505.14; 137/524; 251/337

(58) Field of Classification Search ................. 137/270, 137/357, 494, 495, 505.14, 510, 524; 251/337
See application file for complete search history.

(56) References Cited

U.S. PATENT DOCUMENTS

| 1,722,345 | A | * | 7/1929 | Thune ........................ 137/224 |
| 2,902,046 | A | * | 9/1959 | Dollison ...................... 137/467 |
| 3,032,060 | A | * | 5/1962 | Huffman ............... 137/516.15 |
| 3,412,650 | A |  | 11/1968 | Stang, Jr. |
| 3,451,421 | A |  | 6/1969 | Vicenzi et al. |
| 3,547,427 | A |  | 12/1970 | Kelly et al. |
| 3,747,629 | A |  | 7/1973 | Bauman |

(Continued)

FOREIGN PATENT DOCUMENTS

| DE | 16 75 435 A1 | 4/1970 |
| GB | 2 360 348 A | 9/2001 |

OTHER PUBLICATIONS

International Search Report for PCT/IT2005/000356 dated Sep. 29, 2005.

*Primary Examiner*—John Rivell
*Assistant Examiner*—William McCalister
(74) *Attorney, Agent, or Firm*—Altera Law Group, LLC (57) ABSTRACT

A device for regulating the delivery pressure of gases includes a valve unit having at least one valve seat and a respective closure element displaceable along an axis with respect to the valve seat which is controlled by a diaphragm. The device further includes a first spring which acts on the diaphragm in order to subject it to a preselected resilient load. A second spring is selectively activated to exert an additional resilient load on the diaphragm. The device includes a handle associated with the first and second springs in order to impose selectively the desired delivery pressure value, between a minimum value and a maximum value of pre-calibration, the pressure value being proportionally correlated with a predetermined resilient load exerted on the diaphragm.

28 Claims, 6 Drawing Sheets

U.S. PATENT DOCUMENTS

| | | | |
|---|---|---|---|
| 3,935,626 A * | 2/1976 | Genbauff | 29/890.128 |
| 3,936,919 A * | 2/1976 | Genbauffe | 29/890.124 |
| 3,938,542 A | 2/1976 | Bolha et al. | |
| 4,691,734 A * | 9/1987 | Fort | 137/493.4 |
| 4,951,918 A * | 8/1990 | Wells et al. | 251/321 |
| 5,657,787 A * | 8/1997 | Diehl et al. | 137/116.5 |
| 5,988,204 A | 11/1999 | Reinhardt et al. | |
| 6,170,507 B1 * | 1/2001 | Dalton et al. | 137/12 |
| 6,276,392 B1 | 8/2001 | Hendrickson | |
| 7,360,555 B2 * | 4/2008 | Bruhat et al. | 137/460 |

* cited by examiner

DEVICE FOR REGULATING THE DELIVERY PRESSURE OF COMBUSTIBLE GASES

This application is a U.S. National Phase Application of PCT International Application PCT/IT2005/000356 which is incorporated by reference herein.

TECHNICAL FIELD

The present invention relates to a device for regulating the delivery pressure of combustible gases.

BACKGROUND OF THE INVENTION

It is well known that such devices are used for regulating the pressure at which combustible gases are delivered to burners or similar equipment in order to keep substantially constant the value of the delivery pressure when the supply pressure varies.

The invention is applicable in particular to the specific technical field of pressure regulators that are arranged for use with combustible gases of various natures, such as, for example, natural gas and liquid gas, which have combustibility characteristics which differ from one another and which are such as to require corresponding separate operations for calibrating the regulator.

As is known, natural gas is normally supplied at a pressure lower than that of liquid gas and it is therefore preferable to provide in the distribution network, or in the equipment arranged for the alternative use of either of the two above-mentioned gases, pressure regulators in which a device capable of converting the regulator between two different calibration configurations is integrated.

An example of a regulating device having the above-mentioned features is known from U.S. Pat. No. 3,747,629. This document describes a pressure regulator which is provided with a first springing system which acts on the diaphragm of the regulator to determine a first pressure value, in the case of use with natural gas, and a second, additional, springing system which can be selectively activated to exert on the diaphragm a resilient load correlated with a second preselected pressure value, which is desired in the case of use with liquid gas. The passage from the first to the second calibration configuration is achieved by an auxiliary spacer means acting on the second springing system in the second configuration. The pre-setting of the two pressure values can in turn be regulated by screw means arranged to pre-load resiliently the respective springing systems. Thus, in order to use the device, the only requirement is the activation of the conversion spacer means in order to pass from one to the other of the configurations provided for, without requiring any other regulating intervention.

Also known in this field is the requirement to be able to keep the delivery pressure substantially constant when the flow rate varies, because the pressure tends to decrease as a function of the increase in the power required at the equipment. In applications in which the flow supplied can vary substantially (owing to the variation in the power required), a different and specific pre-setting is therefore desirable for each functioning condition and also for each of the gases provided for in the application.

SUMMARY OF THE INVENTION

A principal object of the present invention is to provide a pressure-regulating device which is structurally and functionally designed to satisfy the indicated requirements, at the same time overcoming the limits pointed out with reference to the mentioned prior art.

This and other objects which will emerge clearly hereinafter are achieved by a device for regulating the delivery pressure of combustible gases.

According to one aspect of the invention, a device for regulating the delivery pressure of gases of various natures is provided. The device comprises a valve unit having at least one valve seat and a respective closure element which is controlled by a diaphragm. The closure element is associated with the seat and is displaceable along a predetermined axis (X) during the movement of opening/closing the seat. A first resilient actuator means can be regulated and can act on the diaphragm in order to subject it to a preselected resilient load. A first means for regulating the resilient load is exerted on the diaphragm by the first resilient means. A second resilient means can be regulated and activated selectively to exert an additional resilient load on the diaphragm, in addition to the resilient load exerted by the first resilient means. A second means is provided for regulating the load exerted by the second resilient means. The second regulating means includes check means for the second resilient means. The check means may be associated selectively with the regulating device to convert it from a first operative configuration in which the second resilient means are inactive and are not exerting any resilient load on the diaphragm, to a second operative configuration in which the second resilient means are selectively activated to exert a preselected resilient load on the diaphragm. The first and second resilient actuator means comprise respective springing systems which act directly on the diaphragm and which are coaxial with the axis. The device comprises a handle-form operating means common to and associated with the first and second regulating means in order to impose selectively, in each of the operative configurations, the desired delivery pressure value between a minimum value and a maximum value of pre-calibration. The pressure value is proportionally correlated with a predetermined resilient load exerted on the diaphragm.

BRIEF DESCRIPTION OF THE DRAWINGS

Further characteristics and advantages of the invention will become clear from the following detailed description of some preferred examples of embodiment thereof, illustrated, for the purposes of guidance and without restrictive intent, with reference to the attached drawings, in which.

DETAILED DESCRIPTION OF THE INVENTION

Figure 1:
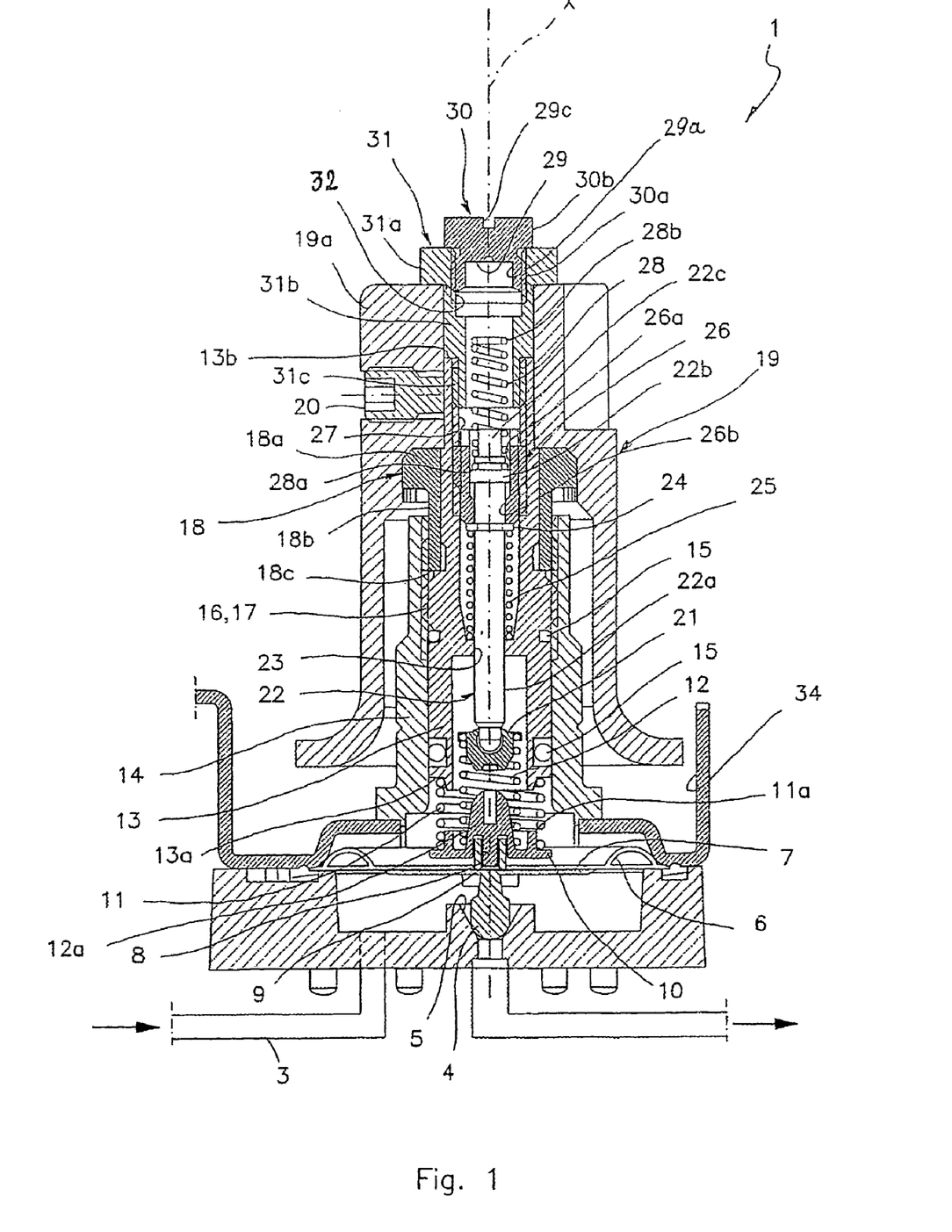
FIG. 1 is a view in axial section of a first example of a regulating device according to the invention in a first operative configuration.
Figure 2:
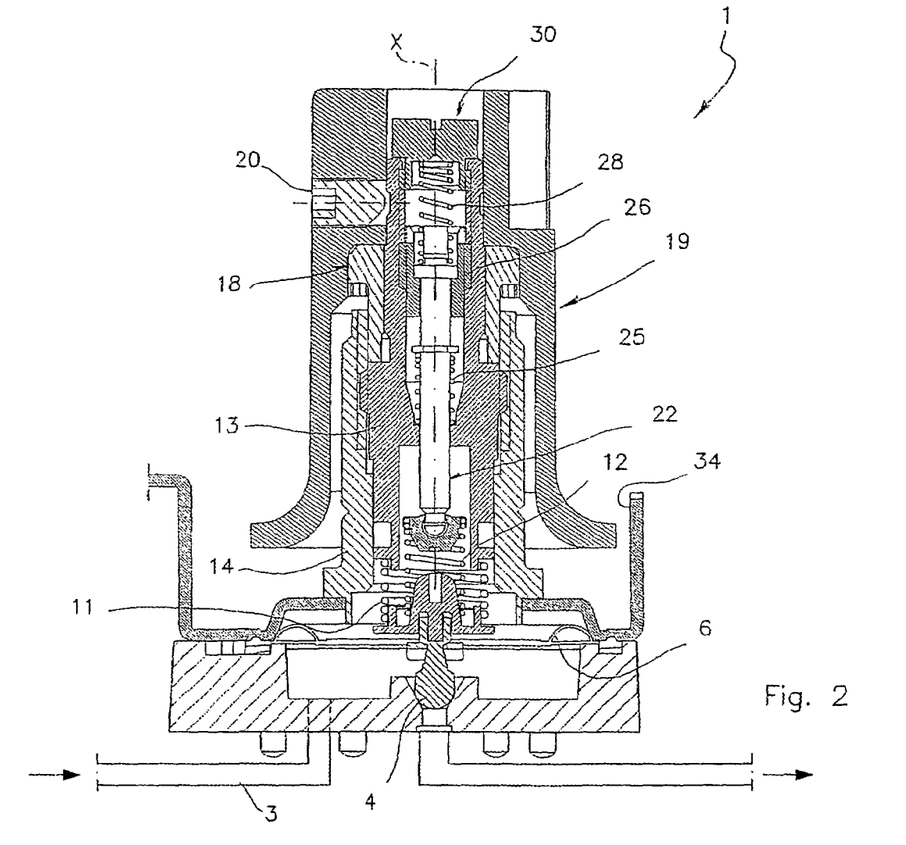
FIG. 2 is a view in axial section of the regulating device of FIG. 1 in a second distinct operative configuration.

With initial reference to FIGS. 1 and 2, a first example of a device for regulating the delivery pressure of combustible gases which is produced in accordance with the present invention is generally indicated by 1.

The device 1 comprises a valve unit located in a duct 3 (shown schematically) and including a closure element 4 capable of shutting off a valve seat 5 by way of which a stream of gas is delivered to a consumer, such as a burner or similar equipment not illustrated in the drawings. The closure element 4 is displaceable during the movement of opening/closing the seat 5 in a direction identified in the drawings by the axis X.

The device 1 also comprises a diaphragm 6 which controls the closure element 4 and which is connected rigidly thereto by a connecting element 7.

On the element 7 is a cylindrical blind seat 8 which is coaxial with the axis X and in which a rod 9 of a spring-carrying disc 10 is supported rotatably about said axis. A first and a second spring, which are coaxial with each other and with the axis X and which are indicated 11 and 12, respectively, act directly on the disc 10. In more detail, the corresponding axial ends of the springs 11, 12 are fitted on respective protuberances 11a, 12a which extend from the spring-carrying disc 10 and which are suitable for holding and guiding the springs on the disc.

At its opposite axial end, the spring 11 abuts a corresponding end 13a of a tubular formation (or first checker) 13 which is centrally hollow and which extends axially along the axis X. Said tubular formation 13 is guided axially and rotatably inside a sleeve 14 which is connected rigidly to a stationary structure of the valve unit and which extends coaxially with the axis X.

15 indicates sealing rings interposed between the surfaces of the sleeve 14 and of the tubular casing 13 which are coupled slidingly to one another. A male thread/female thread coupling is also provided between those surfaces, in particular between an externally threaded portion 16 of the tubular formation 13 and a female thread 17 formed by internal threading of the sleeve 14.

18 indicates an axially hollow ring capable of being fitted on the tubular formation 13. The ring has a head 18a from which extends a cylindrical shell 18b which is threaded externally at the location of its free axial end 18c so that it can be screwed into the female thread 17 of the sleeve 14 (with the shell 18b interposed between the sleeve 14 and the tubular formation 13).

The ring 18 is used, among other things, to cancel out the clearance of the male thread/female thread coupling 16, 17. The ring is also fixed for rotation and axial translation with the tubular formation 13.

It should be noted that, by rotating the tubular formation 13 about the axis X, the formation is subjected to an axial translation movement owing to the male thread/female thread coupling 16, 17, and consequently the resilient pre-loading of the spring 11 can be varied between a minimum value and a maximum value which are predetermined during the stage of calibrating the device. Advantageously, the resilient load is selected in such a manner that, in the case of use with combustible natural gas, the above-mentioned pre-setting guarantees the desired values of the gas delivery pressure downstream of the closure element 4.

In order to set the tubular formation 13 in rotation, the device 1 is provided with a substantially bell-shaped handle-form operating means 19 which extends from a centrally hollow head 19a and which is fitted on the tubular formation 13 and is also fixedly joined thereto by a screw means, such as a locking grub screw 20. The handle 19 is also locked on the ring 18, for example by means of a coupling having a grooved axial profile.

At the end opposite that fitted on the protuberance 12a, the second spring 12 abuts a guide element 21 which is in turn connected to the free end of a rod-shaped stem 22 which extends coaxially with the axis X and which is guided axially inside the axial cavity of the tubular formation 13. In this connection, a first shoulder 23 is provided in the tubular formation 13 and is capable of holding and guiding a corresponding portion 22a of the stem.

A shoulder surface 24, which is advantageously produced in the form of a resilient ring, is also provided on the stem portion 22a. A spring 25 whose function will emerge clearly in the course of the description is active between the facing surfaces formed by the shoulders 23 and 24.

The stem portion 22a is also held and guided axially by an element in the form of a centrally hollow bush 26 having an external cylindrical profile threaded in such a manner that it can be screwed into a female thread 27 formed by the internal threading of part of the axial cavity formed at the end 13b of the tubular formation 13, which is axially opposite the end 13a.

The first axial portion 26a which is extended by a second portion 26b of smaller diameter is formed in the axial through-hole of the bush 26. The first portion 26a constitutes a cylindrical guide means for a corresponding cylindrical portion 22b of the stem 22 having a diameter larger than that of the portion 22a. The second portion 26b, on the other hand, constitutes an axial guide for the portion 22a, while the shoulder surface formed between the portions 26a and 26b acts as an abutment check element for the portion 22b, with the function of limiting the axial travel of the stem 22. It should be noted that the position of this travel stop abutment can be regulated axially by means of the male thread/female thread coupling between the bush 26 and the tubular formation 13.

A terminal stem portion 22c on which an end portion 28a of a spring 28 having an opposite free end indicated 28b is fitted, is provided at the free end of the stem 22, which end is opposite that connected to the element 21.

As shown in the configuration of the device of FIG. 1, the end 28b of the spring 28 is kept spaced from a check surface 29 which faces it and which is formed in a screw element 30. This spaced position is achieved by the interposition of a bush 31 between the screw 30 and the tubular formation 13. To be more precise, the bush 31 has an axial hole and is provided with a head 31a from which extends a cylindrical shell portion 31b which is in turn axially extended by an externally threaded end portion 31c. The end portion 31c can be screwed into the female thread 27 of the tubular formation 13 while the cylindrical portion 31b is guided in the through-hole through the handle 19. The head 31a is advantageously provided with a polygonal external profile in order to permit the engagement of a control key.

At the location of the head 31a, the axial through-hole in the bush 31 has an internally threaded portion 32 into which a corresponding externally threaded shank portion 30a of the screw 30 can be screwed.

The surface 29 is formed in the screw at the base of a blind cavity 29a formed axially in the shank 30a at the end opposite a head portion 30b of the screw. The head 30b is provided with a notch 29c for the engagement of a screwdriver.

In the configuration of FIG. 2, it is provided that the bush 31 is removed beforehand from the device 1 and the screw 30 is screwed directly into the tubular formation 13, by mutual screwing engagement between the threaded portion 30a and the female thread 27. In this configuration, the end 28b of the spring 28 is actively checked by the base surface (or second checker) 29 of the screw 30, with consequent compression of the spring 28 (and of the other springing systems axially associated therewith along the stem 22) and generation of a corresponding resilient load on the diaphragm 6. It should be noted that the resilient load is added, in the configuration of FIG. 2, to the resilient load generated by the spring 11.

Figure 3:
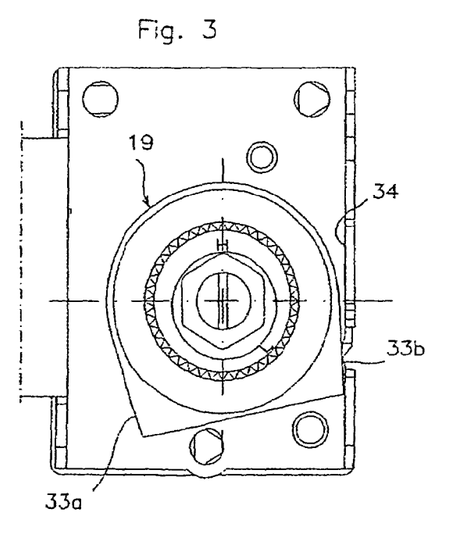
FIGS. 3 and 4 are plan views from above of the device according to the invention shown in the preceding figures.
Figure 4:
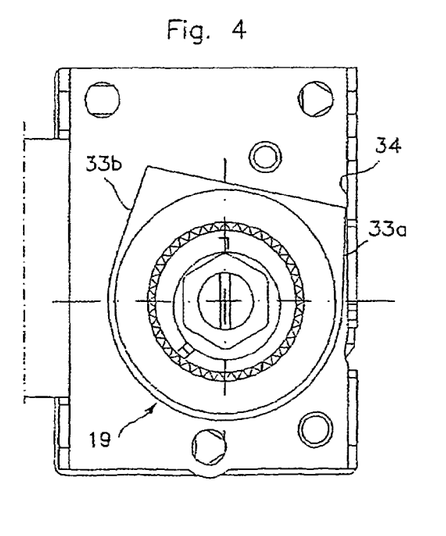

As shown in FIGS. 3 and 4, the handle 19 is also provided with a pair of check surfaces 33a, 33b which can interfere with a corresponding abutment surface 34 in the stationary structure of the device 1. These surfaces 33a, 33b, by interfering with the abutment 34, act as elements limiting the angular regulating travel (with rotation about the axis X) of the handle 19.

In operation, the configuration of FIG. 1 is that typically provided when the regulating device is used with combustible natural gas. In this configuration the diaphragm 6 is acted upon by the resilient load generated exclusively by the compression of the spring 11, which is achieved by regulating the axial position of the tubular formation 13. Before the calibration stage, the ring 18 is locked on the tubular formation 13 so as to remain fixedly joined thereto for rotation (about the axis X) and for translation (along the axis X).

At the stage of calibrating the device 1, the axial position of the end 13a of the tubular formation 13 (and of the ring 18) corresponding to the minimum resilient load, which is correlated with the minimum delivery pressure desired, is determined. Once this position has been defined, the handle 19 is inserted and locked in such a manner that a condition of abutment of the check surface 33a of the handle on the abutment 34 corresponds to the above-mentioned position.

The axial position corresponding to the maximum resilient load, which is correlated with the maximum delivery pressure obtainable, is determined in a similar manner. Once this position has been defined, it is combined with the operative regulating condition in which the check surface 33b of the handle interferes with the abutment 34. A rotation of the handle of approximately 210° is advantageously provided in order to pass from the minimum to the maximum delivery pressure in the configuration of FIG. 1. In addition, in the configuration of FIG. 1, the spring 25 is used to cancel out the pre-loading of the spring 12 and also to oppose the weight of the stem 22 and of the other masses associated therewith.

On the other hand, the configuration of FIG. 2 is that typically provided when the regulating device is used with combustible liquid gas, having different combustibility characteristics from those of natural gas.

In this configuration, after the bush 31 has been removed, the screw 30 is screwed directly into the tubular formation 13 in order to generate on the spring 28 a resilient pre-load capable of moving the stem 22 as far as the condition in which the stem portion 22b abuts the shoulder formed between the portions 26a and 26b of the bush 26. At the calibration stage, regulation of the axial position of the bush 26 (which determines a travel limit of the stem 22 in the direction of the axis X) and suitable dimensioning of the spring 28, and also of the springs 12 and 25, pre-set the delivery pressure values desired at the location of the maximum and minimum handle positions 19 (shown in FIGS. 3 and 4).

From this it advantageously follows that, in operation, the conversion of the device from one to the other of the above-mentioned configurations, owing to the change in the gas delivered, requires only the insertion or removal of the spacer bush 31, without the necessity for any other regulating intervention, because the delivery pressure values obtainable have been imposed beforehand at the calibration stage by means of the regulation measures discussed above. When the device is used, all that is required, in the first configuration (use with natural gas), is that the bush 31 should be screwed in until the head 31a abuts the corresponding surface of the handle head, while, in the second configuration (use with liquid gas), all that is required is that, after the bush 31 has been removed, the screw 30 should be screwed in until the head 30b of the screw abuts the tubular formation 13 axially, at the location of its end 13b.

With reference to FIGS. 5 to 8, 100 indicates the whole of a second example of a device for regulating the delivery pressure of combustible gases, made in accordance with the present invention, in which, where considered appropriate, details similar to those of the preceding example have been identified by the same reference numerals.

Figure 5:
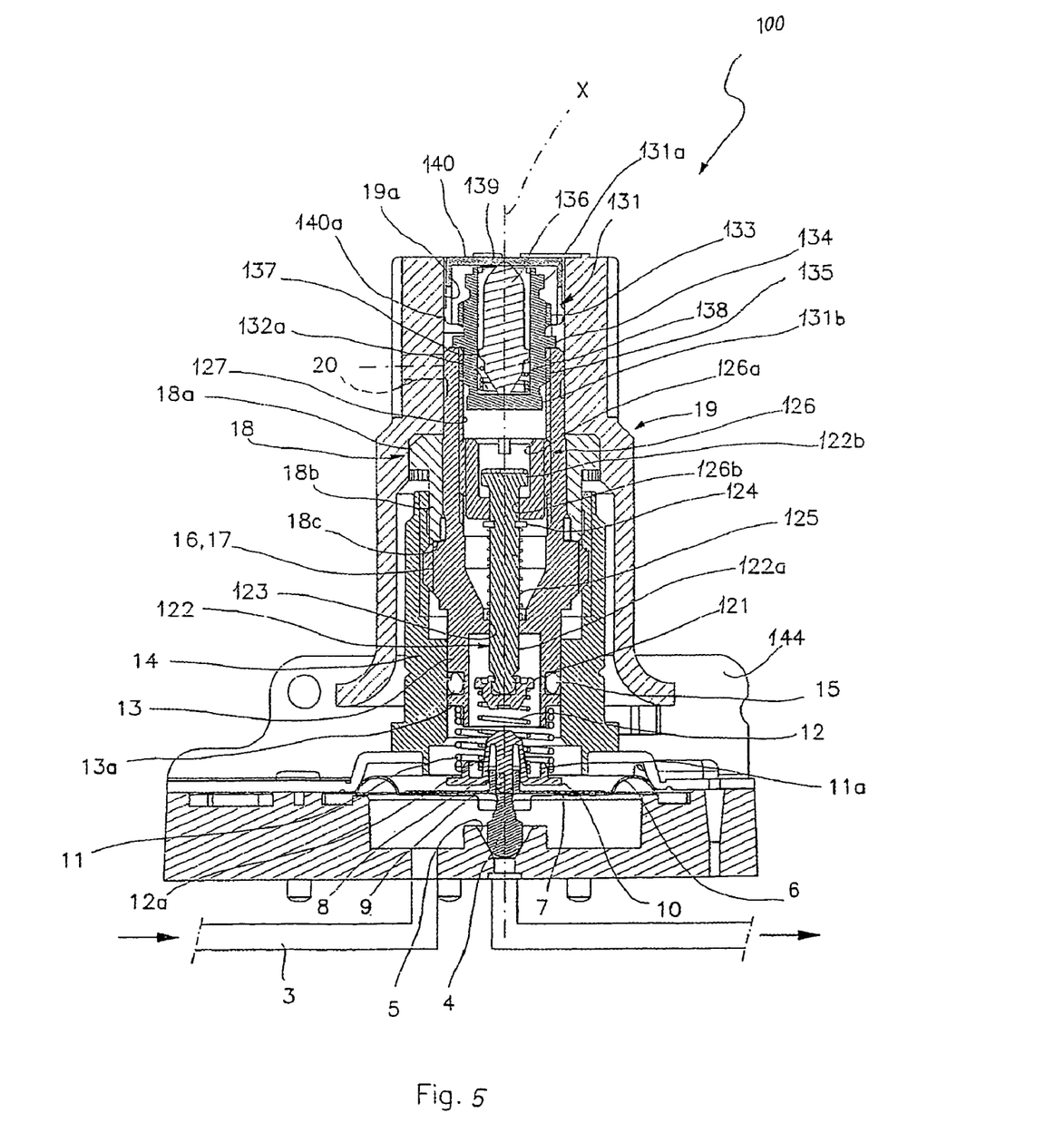
FIG. 5 is a view in axial section of a second example of a regulating device according to the invention in a first operative configuration.
Figure 6:
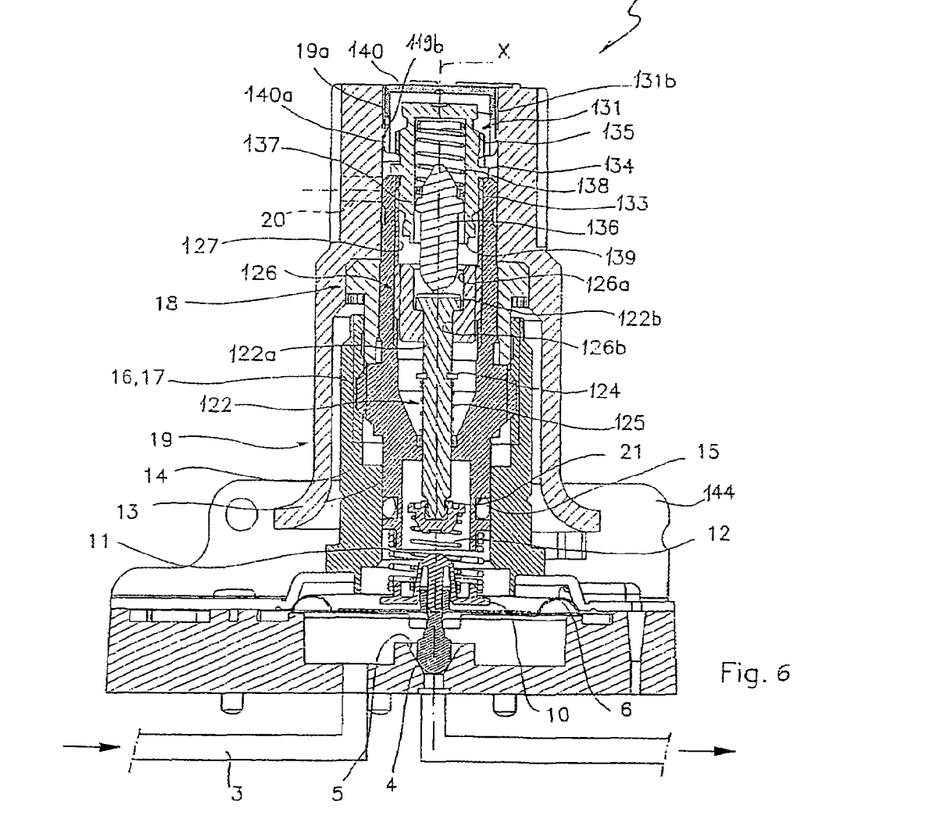
FIG. 6 is a view in axial section of the regulating device of FIG. 5 in a second distinct operative configuration.

The device 100 comprises a valve unit located in a duct 3 (shown schematically) and including a closure element 4 capable of shutting off a valve seat 5 by way of which a stream of gas is delivered to a consumer, such as a burner or similar equipment not illustrated in the drawings. The closure element 4 is displaceable during the movement of opening/closing the seat 5 in a direction identified in the drawings by the axis X.

The device 100 also comprises a diaphragm 6 which controls the closure element 4 and which is connected rigidly thereto by a connecting element 7.

On the element 7 is a cylindrical blind seat 8 which is coaxial with the axis X and in which a rod 9 of a spring-carrying disc 10 is supported rotatably about said axis. A first and a second spring, which are coaxial with each other and with the axis X and which are indicated 11 and 12, respectively, act directly on the disc 10. In more detail, the corresponding axial ends of the springs 11, 12 are fitted on respective protuberances 11a, 12a which extend from the spring-carrying disc 10 and which are suitable for holding and guiding the springs on the disc.

At its opposite axial end, the spring 11 abuts a corresponding end 13a of a tubular formation (or first checker) 13 which is centrally hollow and which extends axially along the axis X. Said tubular formation 13 is guided axially and rotatably inside a sleeve 14 which is connected rigidly to a stationary structure of the valve unit and which extends coaxially with the axis X.

15 indicates sealing rings interposed between the surfaces of the sleeve 14 and of the tubular casing 13 which are coupled slidingly to one another. A male thread/female thread coupling is also provided between those surfaces, in particular between an externally threaded portion 16 of the tubular formation 13 and a female thread 17 formed by internal threading of the sleeve 14.

18 indicates an axially hollow ring capable of being fitted on the tubular formation 13. The ring has a head 18a from which extends a cylindrical shell 18b which is threaded externally at the location of its free axial end 18c so that it can be screwed into the female thread 17 of the sleeve 14 (with the shell 18b interposed between the sleeve 14 and the tubular formation 13).

The ring 18 is used, among other things, to cancel out the clearance of the male thread/female thread coupling 16, 17. The ring is also fixed for rotation and axial translation with the tubular formation 13.

It should be noted that, by rotating the tubular formation 13 about the axis X, the formation is subjected to an axial translation movement owing to the male thread/female thread coupling 16, 17, and consequently the resilient pre-loading of the spring 11 can be varied between a minimum value and a maximum value which are predetermined during the stage of calibrating the device. Advantageously, the resilient load is selected in such a manner that, in the case of use with combustible natural gas, the above-mentioned pre-setting guarantees the desired values of the gas delivery pressure downstream of the closure element 4.

In order to set the tubular formation 13 in rotation, the device 100 is provided with a substantially bell-shaped handle-form operating means 19 which extends from a centrally hollow head 19a and which is fitted on the tubular formation 13 and is also fixedly joined thereto by a screw means, such as a locking grub screw 20, which is only shown schematically in the drawings. The handle 19 is also locked on the ring 18, for example by means of a coupling having a grooved axial profile.

At the end opposite that fitted on the protuberance 12a, the second spring 12 abuts a guide element 21 which is in turn connected to the free end of a rod-shaped stem 122 which extends coaxially with the axis X and which is guided axially inside the axial cavity of the tubular formation 13. In this connection, a first shoulder 123 is provided in the tubular formation 13 and is capable of holding and guiding a corresponding portion 122a of the stem.

A shoulder surface 124, which is advantageously produced in the form of a resilient ring, is also provided on the stem portion 122a. A spring 125 whose function will emerge clearly in the course of the description is active between the facing surfaces formed by the shoulders 123 and 124.

The stem portion 122a is also held and guided axially by an element in the form of a centrally hollow bush 126 having an external cylindrical profile threaded in such a manner that it can be screwed into a female thread 127 formed by the internal threading of part of the axial cavity formed at the end 13b of the tubular formation 13, which is axially opposite the end 13a.

A first axial portion 126a which is extended by a second portion 26b of smaller diameter is formed in the axial through-hole of the bush 126. The first portion 126a can constitute a cylindrical guide means for a corresponding cylindrical portion 122b of the stem 122 having a diameter larger than that of the portion 122a. The second portion 126b, on the other hand, constitutes an axial guide for the portion 122a, while the shoulder surface formed between the portions 126a and 126b acts as an abutment check element for the portion 122b, with the function of limiting the axial travel of the stem 122. It should be noted that the position of that travel stop abutment can be regulated axially by means of the male thread/female thread coupling between the bush 126 and the tubular formation 13.

131 indicates a screw element, acted on by a blind axial cavity 132, which can engage by screwing the female thread 127 of the tubular formation 13, at the location of the free end 13b.

In more detail, the screw element 131 has, extending from its axial end 131a towards the opposite end 131b, a first externally threaded shell portion 133, a shoulder 134 and a second externally threaded shell portion 135 (the portions 133 and 135 have the same thread pitch and diameter). The shell portions extending at the locations of the corresponding ends 131a and 131b are shaped with polygonal profiles (hexagonal, for example) for the engagement of corresponding operating keys, to enable the screw element 131 to be screwed in and out. Alternatively, transverse notches can be provided for the engagement of screwdrivers.

The blind cavity 132 is delimited, at one end, by a base surface 132a, and forms a seat for housing a pressure pin 136, whose function will become clearer from the following text. The pin 136 has opposite tapered radial ends, between which a shoulder 137 is also formed. A spring 138, fitted axially on the corresponding pin portion, is also active between the shoulder 137 and the base (or second checker) 132 of the seat. In order to retain the pin 136 in the seat of the blind cavity 132, the latter is provided with a rim 139 (produced by chamfering, for example) extending at the location of the opening of the cavity in the proximity of the end 131b. The said annular rim 139 has a size such that it does not interfere with the shoulder 137 to prevent the pin 136 from moving completely out of the seat 132.

In the configuration of the device of FIG. 5, the threaded portion 135 of the screw element 131 is screwed into the tubular formation 13 (with the shoulder 134 abutting against the end 13b of the tubular formation), so that the end 131b faces and is spaced apart from the free end of the stem 122. In this configuration the pin 136 is housed in the seat 132. Advantageously, a cover element 140 is provided for closing at least partially the axial through-hole in the handle 19 and consequently keeping the pin 136 housed in the seat 132, in opposition to any resilient action of the spring 138. The cover 140 can be removably fixed to the body of the handle 19, for example with appendages 140a of the cover snap-fitted into corresponding projections 119b of the handle, or can be fixed to the screw element 131, for example by a screwed engagement in the threaded portions 133 or 135.

In the configuration of FIG. 6, the screw element 131 is made to be rotatable through 180° about an axis perpendicularly incident on the axis X with respect to the configuration of FIG. 5, and to be screwed into the tubular formation 13 with its threaded portion 133. In this configuration, the pressure pin 136 acts on the stem 122, by means of the resilient action of the spring 138, so as to displace the stem 122 to abut the shoulder surface formed between the portions 126a and 126b of the bush 126. Consequently, the resilient load generated by the compression of the spring 12 (and of the other springing systems associated with it along the stem 122) is added to the resilient load exerted on the diaphragm 6 by the spring 11.

Figure 7:
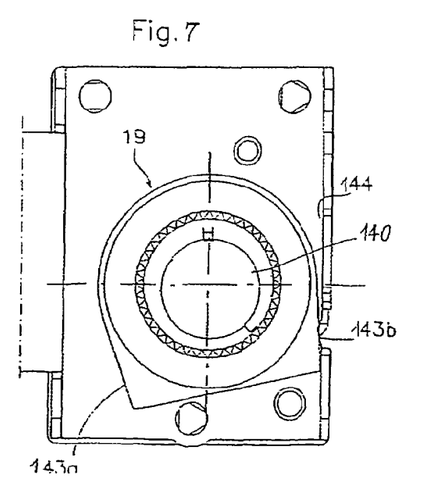
FIGS. 7 and 8 are plan views from above of the device according to the invention shown in FIGS. 5 and 6.
Figure 8:
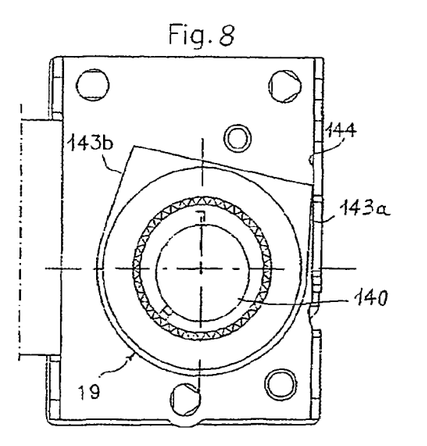

As shown in FIGS. 7 and 8, the handle 19 is also provided with a pair of check surfaces 143a, 143b which can interfere with a corresponding abutment surface 144 in the stationary structure of the device 100. These surfaces 143a, 143b, by interfering with the abutment 144, act as elements limiting the angular regulating travel (with rotation about the axis X) of the handle 19.

In operation, the configuration of FIG. 5 is that typically provided when the regulating device is used with combustible natural gas. In this configuration the diaphragm 6 is acted upon by the resilient load generated exclusively by the compression of the spring 11, which is achieved by regulating the axial position of the tubular formation 13. Before the calibration stage, the ring 18 is locked on the tubular formation 13 so as to remain fixedly joined thereto for rotation (about the axis X) and for translation (along the axis X).

At the stage of calibrating the device 100, the axial position of the end 13a of the tubular formation 13 (and of the ring 18) corresponding to the minimum resilient load, which is correlated with the minimum delivery pressure desired, is determined. Once this position has been defined, the handle 19 is inserted and locked in such a manner that a condition of abutment of the check surface 143a of the handle on the abutment 144 corresponds to the above-mentioned position.

The axial position corresponding to the maximum resilient load, which is correlated with the maximum delivery pressure obtainable, is determined in a similar manner. Once this position has been defined, it is combined with the operative regulating condition in which the check surface 143*b* of the handle interferes with the abutment 144. A rotation of the handle of approximately 210° is advantageously provided in order to pass from the minimum to the maximum delivery pressure in the configuration of FIG. 5. In addition, in the configuration of FIG. 5, the spring 125 is used to cancel out the pre-loading of the spring 12 and also to oppose the weight of the stem 122 and of the other masses associated therewith.

On the other hand, the configuration of FIG. 6 is that typically provided when the regulating device is used with combustible liquid gas, having different combustibility characteristics from those of natural gas.

To obtain this configuration, the cover 140 is first disengaged and the threaded portion 135 is unscrewed from the corresponding female thread of the tubular formation 13. Once the screw 131 has been disengaged, it is rotated through 180° (in the plane of the drawings) with respect to a direction perpendicular to the axis X and is screwed into the female thread 127 of the tubular formation 13 by means of the threaded portion 133, until the shoulder 134 abuts the end 13*b*. The cover 140 is then refitted on the handle 19.

In this configuration, the pin 136, which is resiliently loaded by the spring 138, interferes with the stem 122, pushing the latter into the position shown in FIG. 6, in which the stem portion 122*b* abuts the shoulder formed between the portions 126*a* and 126*b* of the bush 126. At the calibration stage, regulation of the axial position of the bush 126 (which determines a travel limit of the stem 122 in the direction of the axis X) and suitable dimensioning of the spring 138, and also of the springs 12 and 125, pre-set the delivery pressure values desired at the location of the maximum and minimum handle positions 19 (shown in FIGS. 7 and 8).

From that it advantageously follows that, in operation, the conversion of the device from one to the other of the above-mentioned configurations, owing to the change in the gas delivered, requires only the fitting of the screw element 131, in one or other of the positions described above, without the necessity for any other regulating intervention, because the delivery pressure values obtainable have been imposed beforehand at the calibration stage by means of the regulation measures discussed above.

Advantageously, the externally visible part of the surface of the base portion of the cavity 132 can be made to have a colour (red, for example) which is different from the colour provided in the end area of the pressure pin 136 (blue, for example) opposite the end 132. Making the cover 140 from at least partially transparent material will thus make the areas with different colours visible from the outside, allowing fast and easy identification of the configuration present in the pressure regulator.

With reference to FIGS. 9 to 12, 200 indicates the whole of a third example of a device for regulating the delivery pressure of combustible gases, made in accordance with the present invention, in which, where considered appropriate, details similar to those of the preceding examples have been identified by the same reference numerals.

Figure 9:
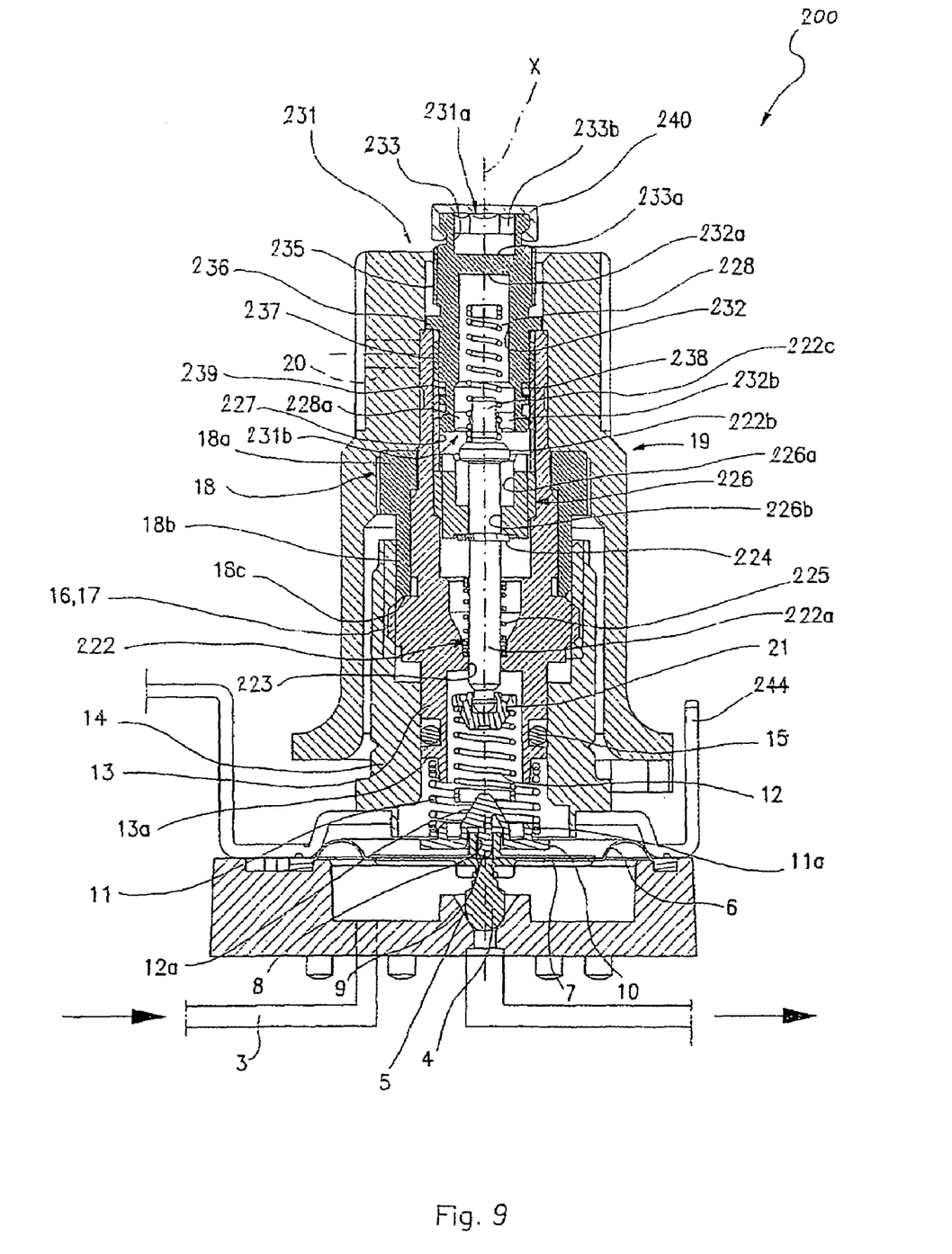
FIG. 9 is a view in axial section of a third example of a regulating device according to the invention in a first operative configuration.
Figure 10:
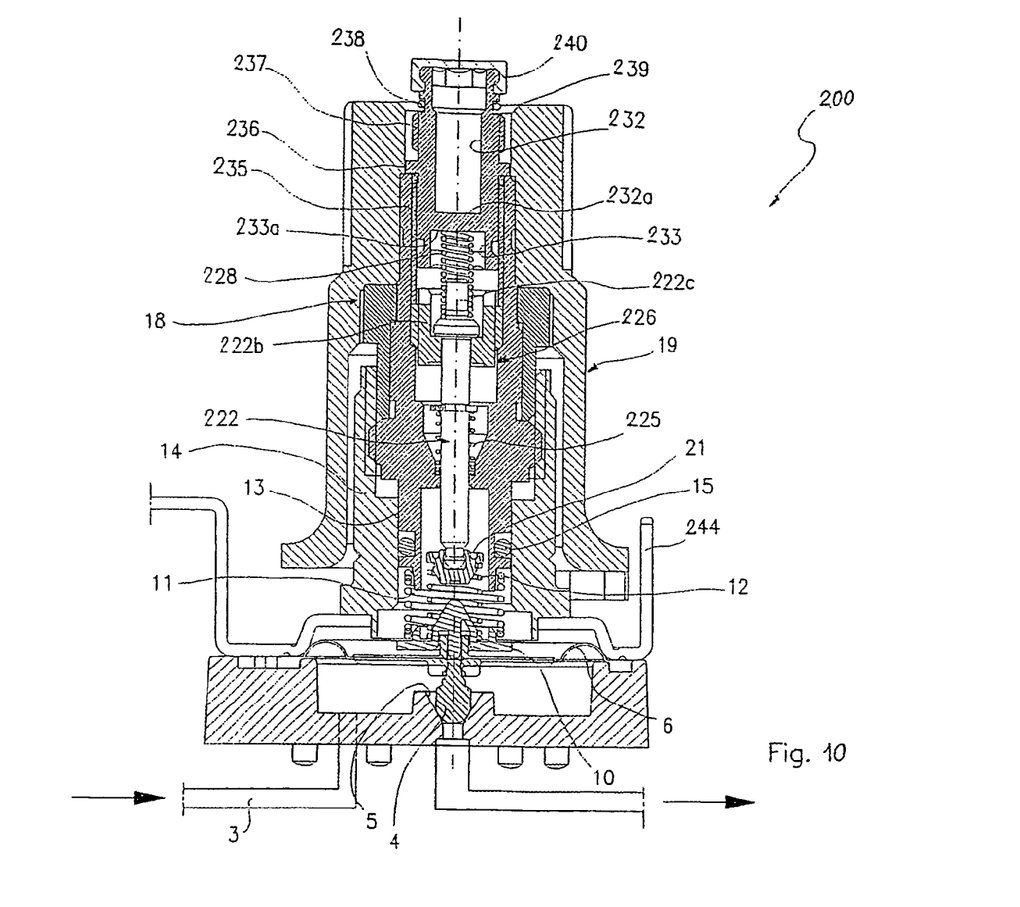
FIG. 10 is a view in axial section of the regulating device of FIG. 9 in a second distinct operative configuration.

The device 200 comprises a valve unit located in a duct 3 (shown schematically) and including a closure element 4 capable of shutting off a valve seat 5 by way of which a stream of gas is delivered to a consumer, such as a burner or similar equipment not illustrated in the drawings. The closure element 4 is displaceable during the movement of opening/closing the seat 5 in a direction identified in the drawings by the axis X.

The device 200 also comprises a diaphragm 6 which controls the closure element 4 and which is connected rigidly thereto by a connecting element 7.

On the element 7 is a cylindrical blind seat 8 which is coaxial with the axis X and in which a rod 9 of a spring-carrying disc 10 is supported rotatably about said axis. A first and a second spring, which are coaxial with each other and with the axis X and which are indicated 11 and 12, respectively, act directly on the disc 10. In more detail, the corresponding axial ends of the springs 11, 12 are fitted on respective protuberances 11*a*, 12*a* which extend from the spring-carrying disc 10 and which are suitable for holding and guiding the springs on the disc.

At its opposite axial end, the spring 11 abuts a corresponding end 13*a* of a tubular formation (or first checker) 13 which is centrally hollow and which extends axially along the axis X. Said tubular formation 13 is guided axially and rotatably inside a sleeve 14 which is connected rigidly to a stationary structure of the valve unit and which extends coaxially with the axis X.

15 indicates sealing rings interposed between the surfaces of the sleeve 14 and of the tubular casing 13 which are coupled slidingly to one another. A male thread/female thread coupling is also provided between those surfaces, in particular between an externally threaded portion 16 of the tubular formation 13 and a female thread 17 formed by internal threading of the sleeve 14.

18 indicates an axially hollow ring capable of being fitted on the tubular formation 13. The ring has a head 18*a* from which extends a cylindrical shell 18*b* which is threaded externally at the location of its free axial end 18*c* so that it can be screwed into the female thread 17 of the sleeve 14 (with the shell 18*b* interposed between the sleeve 14 and the tubular formation 13).

The ring 18 is used, among other things, to cancel out the clearance of the male thread/female thread coupling 16, 17. The ring is also fixed for rotation and axial translation with the tubular formation 13.

It should be noted that, by rotating the tubular formation 13 about the axis X, the formation is subjected to an axial translation movement owing to the male thread/female thread coupling 16-17, and consequently the resilient pre-loading of the spring 11 can be varied between a minimum value and a maximum value which are predetermined during the stage of calibrating the device. Advantageously, the resilient load is selected in such a manner that, in the case of use with combustible natural gas, the above-mentioned pre-setting guarantees the desired values of the gas delivery pressure downstream of the closure element 4.

In order to set the tubular formation 13 in rotation, the device 200 is provided with a substantially bell-shaped handle-form operating means 19 which extends from a centrally hollow head 19*a* and which is fitted on the tubular formation 13 and is also fixedly joined thereto by a screw means, such as a locking grub screw 20, which is only shown schematically in the drawings. The handle 19 is also locked on the ring 18, for example by means of a coupling having a grooved axial profile.

At the end opposite that fitted on the protuberance 12*a*, the second spring 12 abuts a guide element 21 which is in turn connected to the free end of a rod-shaped stem 222 which extends coaxially with the axis X and which is guided axially inside the axial cavity of the tubular formation 13. In this connection, a first shoulder 223 is provided in the tubular formation 13 and is capable of holding and guiding a corresponding portion 222*a* of the stem.

A shoulder surface 224, which is advantageously produced in the form of a resilient ring, is also provided on the stem portion 222a. A spring 225 whose function will emerge clearly in the course of the description is active between the facing surfaces formed by the shoulders 223 and 224.

The stem portion 222a is also held and guided axially by an element in the form of a centrally hollow bush 226 having an external cylindrical profile threaded in such a manner that it can be screwed into a female thread 227 formed by the internal threading of part of the axial cavity formed at the end 13b of the tubular formation 13, which is axially opposite the end 13a.

A first axial portion 226a which is extended by a second portion 226b of smaller diameter is formed in the axial through-hole of the bush 226. The first portion 226a constitutes a cylindrical guide means for a corresponding cylindrical portion 222b of the stem 222 having a diameter larger than that of the portion 222a. The second portion 226b, on the other hand, constitutes an axial guide for the portion 222a, while the shoulder surface formed between the portions 226a and 226b acts as an abutment check element for the portion 222b, with the function of limiting the axial travel of the stem 222. It should be noted that the position of this travel stop abutment can be regulated axially by means of the male thread/female thread coupling between the bush 226 and the tubular formation 13.

A terminal stem portion 222c, on which an end portion 228a of a spring 228 having an opposite free end is fitted, is provided at the free end of the stem 222, which end is opposite that connected to the element 21.

231 indicates a screw element affected by a pair of blind axial cavities, indicated 232 and 233, respectively, which are coaxial with each other and separated by a wall. The wall 234 defines, on opposite sides, respective base surfaces (or second checker) 232a, 233a of the corresponding cavities 232, 233. The cavity 232 also has a greater axial length than has the cavity 233. Each cavity 232, 233 is also provided, at the end axially opposite its base surface, with a respective polygonal internal profile 232b, 233b, which is expediently selected for engagement with a hexagonal wrench.

The screw element 231 is capable of being screwed into the female thread 227 of the tubular formation 13, at the location of the free end 13b. In more detail, a first externally threaded shell portion 235, a shoulder 236 and a second externally threaded shell portion 237 (the portions 235 and 237 having the same thread diameter and pitch) are formed on the screw element 231, starting from an axial end 231a thereof in the direction towards the opposite end 231b.

238 indicates a circumferential groove provided at the location of the end 231b, which groove is contiguous with the portion 237 and is also capable of accommodating a ring 239, preferably an O-ring.

In the configuration of the device of FIG. 9, the screw element 231 is screwed by means of its threaded portion 237 into the tubular formation 13 (with the shoulder abutting the end 13b of the tubular formation 13). In that configuration, the end of the spring 228 is maintained at a distance from the base surface 232a of the cavity 232, which surface faces it. 240 indicates a cover element arranged to close the opening of the axial cavity (232 or 233) which remains visible from outside the handle in each of the respective operative conditions. It is provided that the closure element 240 is equipped with a profile for coupling, for example snap-type coupling, to the corresponding profile of each of the ends 231a, 231b of the screw element 231.

In the configuration of FIG. 10, the screw element 231 is made to be rotatable through 180° about an axis perpendicularly incident on the axis X with respect to the configuration of FIG. 9, and to be screwed into the tubular formation 13 with its threaded portion 235. In this configuration, the end of the spring 228 is actively checked by the base surface 233a of the cavity 233, with consequent compression of the spring 228 (and of the other springing systems axially associated therewith along the stem 222) and generation of a corresponding resilient load on the diaphragm 6. It should be noted that the resilient load is added, in the configuration of FIG. 10, to the resilient load generated by the spring 11.

In a similar way to what is provided in the device 100 described above and also shown in FIGS. 11 and 12, the handle 19 of the device 200 is also provided with a pair of check surfaces 143a, 143b which can interfere with a corresponding abutment surface 144 formed in the stationary structure of the device 200. These surfaces 143a, 143b, by interfering with the abutment 144, act as elements limiting the angular regulating travel (with rotation about the axis X) of the handle 19.

In operation, the configuration of FIG. 9 is that typically provided when the regulating device is used with combustible natural gas. In this configuration the diaphragm 6 is acted upon by the resilient load generated exclusively by the compression of the spring 11, which is achieved by regulating the axial position of the tubular formation 13. Before the calibration stage, the ring 18 is locked on the tubular formation 13 so as to remain fixedly joined thereto for rotation (about the axis X) and for translation (along the axis X).

At the stage of calibrating the device 200, the axial position of the end 13a of the tubular formation 13 (and of the ring 18) corresponding to the minimum resilient load, which is correlated with the minimum delivery pressure desired, is determined. Once this position has been defined, the handle 19 is inserted and locked in such a manner that a condition of abutment of the check surface 143a of the handle on the abutment 144 corresponds to the above-mentioned position.

The axial position corresponding to the maximum resilient load, which is correlated with the maximum delivery pressure obtainable, is determined in a similar manner. Once this position has been defined, it is combined with the operative regulating condition in which the check surface 143b of the handle interferes with the abutment 144. A rotation of the handle of approximately 210° is advantageously provided in order to pass from the minimum to the maximum delivery pressure in the configuration of FIG. 9. In addition, in the configuration of FIG. 9, the spring 225 is used to cancel out the pre-loading of the spring 12 and also to oppose the weight of the stem 222 and of the other masses associated therewith.

On the other hand, the configuration of FIG. 10 is that typically provided when the regulating device is used with combustible liquid gas, having different combustibility characteristics from those of natural gas.

To obtain this configuration, the cover 240 is first disengaged and the threaded portion 237 is unscrewed from the corresponding female thread of the tubular formation 13. Once the screw 231 has been disengaged, it is rotated through 180° (in the plane of the drawings) with respect to a direction perpendicular to the axis X and is screwed into the female thread 227 of the tubular formation 13 by means of the threaded portion 235, until the shoulder 236 abuts the end 13b. The cover 240 is then refitted on the handle 19.

In this configuration, the screw 231, with the base surface 233a, interferes with the spring 228 in order to generate on the spring 228 a resilient pre-load capable of moving the stem 222 into the condition in which the stem portion 222b abuts the shoulder formed between the portions 226a and 226b of the bush 226.

Figure 11:
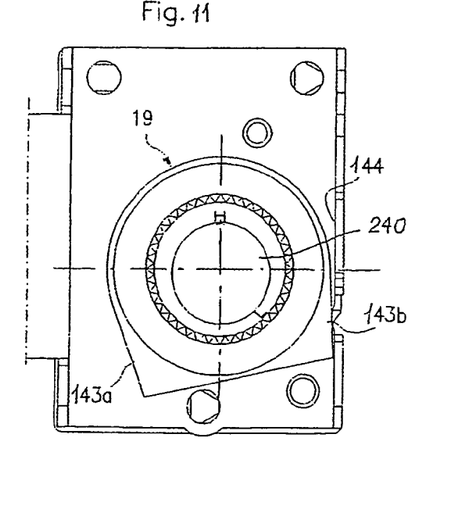
FIGS. 11 and 12 are plan views from above of the device according to the invention shown in FIGS. 9 and 10.
Figure 12:
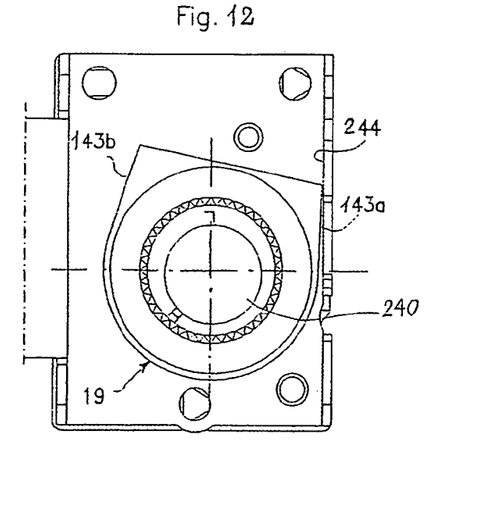

At the calibration stage, regulation of the axial position of the bush 226 (which determines a travel limit of the stem 22 in the direction of the axis X) and suitable dimensioning of the spring 228, and also of the springs 12 and 225, pre-set the delivery pressure values desired at the location of the maximum and minimum handle positions 19 (shown in FIGS. 11 and 12).

It should be noted that, in the configuration of FIG. 10, the ring 239 remains visible outside the handle, thus constituting a means for indicating the configuration selected for using the regulator with combustible liquid gas.

From this it advantageously follows that, in operation, the conversion of the device from one to the other of the above-mentioned configurations, owing to the change in the gas delivered, requires only the fitting of the screw element 231, in one or other of the positions described above, without the necessity for any other regulating intervention, because the delivery pressure values obtainable have been imposed beforehand at the calibration stage by means of the regulation measures discussed above.

Thus the invention achieves the proposed objects while yielding the indicated advantages by comparison with the known solutions.

Attention should be drawn in particular to the improved ease with which the regulating device can be used with combustible gases of various natures in equipment in which regulation of the delivery pressure between at least two minimum and maximum pressure values is required, as a function of the variation in flow required at the burner.

It should also be pointed out that the entire predetermined angular rotation of the handle is used in the modulation between the minimum and maximum delivery pressures, for each of the configurations provided for as a function of the type of gas used.

While exemplary embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A device for regulating the delivery pressure of gases, which is arranged for use with gases of various natures, comprising:

a valve unit having at least one valve seat and a respective closure element which is controlled by a diaphragm, is associated with said seat and is displaceable along a predetermined axis during the movement of opening/closing the seat, a first resilient actuator which can be regulated and which acts on the diaphragm in order to subject it to a first preselected resilient load, a first regulator capable of regulating the first resilient load exerted on the diaphragm by said first resilient actuator, a second resilient actuator which can be regulated and which can be activated selectively to exert an additional resilient load on the diaphragm, in addition to the first resilient load exerted by the first resilient actuator, a second regulator capable of regulating the load exerted by the second resilient actuator, said second regulator including a second checker connected to said second resilient actuator, which second checker can be associated selectively with the regulating device to convert it from a first operative configuration in which said second resilient actuator is inactive and is not exerting any resilient load on the diaphragm, to a second operative configuration in which it is are selectively activated to exert the additional preselected resilient load on the diaphragm, said first and second resilient actuators comprise respective springing systems coaxial with said axis, said first regulator comprising a respective first checker for the corresponding springing system of the first resilient actuator, which is axially displaceable in an adjustable manner along said axis by a male thread/female thread coupling, wherein said corresponding springing system of the first resilient actuator acts on the diaphragm, said device comprises a handle-form operator common to and associated with said first and second regulators in order to impose selectively, in each of said operative configurations, a desired delivery pressure value, between a minimum value and a maximum value of pre-calibration, said pressure value being proportionally correlated with a total predetermined resilient load exerted on the diaphragm, said male thread/female thread coupling is provided between said first checker and a stationary structure of the valve unit, it being possible to fix the handle-form operator for rotation with the first checker about said axis so that the rotational movement of the handle operator is converted into a corresponding axial translation movement of the first checker, with consequent regulation of the first resilient load exerted on the diaphragm by the springing system of the first resilient actuator, and in that the second checker, when activated in said second configuration, is fixed for translation along the axis with the first checker and is also fixed for rotation with the handle-form operator in order to regulate the resilient load of the second resilient actuator by rotation of the handle form operator and wherein adjustable stops are provided for the axial travel, along said axis, of said first and second regulator, in order to define the minimum and maximum values of the total resilient preload acting on the diaphragm in each of said configurations, so as to predetermine in a correlated manner the minimum and maximum values of the delivery pressures that can be imposed in the device.

2. The device according to claim 1, wherein the second checker, when activated, is axially displaceable in an adjustable manner along said axis by a corresponding male thread/female thread coupling with the first checker.

3. The device according to claim 1, wherein the second checker comprises a surface capable of checking the respective springing system of the second resilient actuator, said check surface being formed in a screw element capable of being screwed into a tubular formation of said first regulator, in said second operative configuration.

4. The device according to claim 3, comprising a spacer which is interposed axially in a removable manner between the screw element and the tubular formation in order, in the first operative configuration, to maintain the check surface at a distance from the corresponding springing system in order not to exert any resilient load on said springing system.

5. The device according to claim 4, wherein the spacer is capable of being removed in said second operative configuration, said screw element and said spacer being capable of being screwed, as alternatives to each other, into the same portion of the tubular formation.

6. The device according to claim 4, wherein the screw element is supported on the spacer in the first operative configuration.

7. The device according to claim 3, wherein the springing system of said second resilient actuator, which is capable of being resiliently preloaded by the screw element, is supported axially on an axial end of a stem guided axially inside said tubular formation coaxially with said axis, the opposite axial end of said stem acting on the diaphragm by the interposition of a further springing system.

8. The device according to claim 1, wherein the second checker comprises a pressure element resiliently loaded against said second resilient actuator, in said second configuration.

9. The device according to claim 8, wherein a springing system acting between the pressure element and a screw element is provided and is capable of being screwed into a tubular formation of said first regulator.

10. The device according to claim 9, wherein said screw element comprises a blind axial cavity constituting a seat for at least partially housing said pressure element.

11. The device according to claim 10, wherein said pressure element is retained in said seat in opposition to the resilient action of said springing system.

12. The device according to claim 8, wherein the screw element comprises, on an external shell, a first and a second threaded portion which are axially spaced and either of which is capable of being screwed into a corresponding female thread of the tubular formation, in order to convert the device from the first to the second of said configurations.

13. The device according to claim 12, wherein a shoulder is formed between said first and second threaded portion and constitutes means for the axial abutment of the screw element against the tubular formation in each of said first and second configurations.

14. The device according to claim 10, wherein a closure element is provided which is capable of closing an axial through-hole in said handle, the pressure element interfering with said closure element in said first configuration, so that it is kept housed within the cavity of the screw element, in opposition to the resilient action of said springing system of the second resilient actuator.

15. The device according to claim 9, wherein the pressure element acts in a resilient way, by said springing system, in said second configuration, on an axial end of a stem guided axially inside said tubular formation coaxially with said axis, the opposite axial end of said stem acting on the diaphragm by the interposition of a further springing system.

16. The device according to claim 14, wherein said closure element is fixed removably to said handle or to said screw element.

17. The device according to claim 16, wherein a releasable snap-type lock is provided between the closure element and said handle or said screw element.

18. The device according to claim 1, wherein the second checker comprises a first surface capable of checking the respective springing system of the second resilient actuator, said first check surface being formed in a screw element capable of being screwed into a tubular formation of said first regulator.

19. The device according to claim 18, wherein said first surface is formed at the base of a respective first blind axial cavity provided in the screw element.

20. The device according to claim 18, wherein the screw element is provided with a second blind axial cavity, said cavities being open at the opposite axial ends of the screw element and being separated from one another by a wall which forms, on one side, the first surface and, on the other side, a second, opposite, surface.

21. The device according to claim 20, wherein the second cavity has an axial extent of a magnitude such that, in the first operative configuration, the second surface is maintained at a distance from the corresponding springing system of the second resilient actuator.

22. The device according to claim 18, wherein the screw element comprises, on an external shell, a first and a second threaded portion which are axially spaced and which are capable of being screwed, as alternatives to each other, into a corresponding female thread of the tubular formation, in order to convert the device from the first to the second of said configurations.

23. The device according to claim 22, wherein a shoulder is formed between said first and second threaded portion and constitutes an axial abutment of the screw element against the tubular formation in each of said first and second configurations.

24. The device according to claim 20, wherein a closure element is provided which is capable of closing, alternatively, one or other of the corresponding axial cavities which remain visible outside the handle in said operative configurations.

25. The device according to claim 18, wherein the springing system of said second resilient actuator, which is capable of being resiliently preloaded by the screw element, is supported axially on an axial end of a stem guided axially inside said tubular formation coaxially with said axis, the opposite axial end of said stem acting on the diaphragm by the interposition of a further springing system.

26. The device according to claim 24, wherein said closure element is fixed removably to said handle or to said screw element.

27. The device according to claim 26, wherein a releasable snap-type lock is provided between the closure element and said screw element.

28. The device according to claim 7, wherein said further springing system together with the springing system of the first resilient actuator have respective corresponding ends capable of bearing contact on a spring-carrying disc supported rotatably on the diaphragm about the axis.

* * * * *